(12) United States Patent
Giles et al.

(10) Patent No.: US 8,612,973 B2
(45) Date of Patent: Dec. 17, 2013

(54) METHOD AND SYSTEM FOR HANDLING INTERRUPTS WITHIN COMPUTER SYSTEM DURING HARDWARE RESOURCE MIGRATION

(75) Inventors: Chris M. Giles, Lafayette, CO (US); Russ W. Herrell, Fort Collins, CO (US); John A. Morrison, Fort Collins, CO (US); John R. Planow, Sacramento, CA (US); Joseph F. Orth, Fort Collins, CO (US); Andrew R. Wheeler, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1236 days.

(21) Appl. No.: 11/861,846

(22) Filed: Sep. 26, 2007

(65) Prior Publication Data

US 2009/0083467 A1    Mar. 26, 2009

(51) Int. Cl.
*G06F 9/455* (2006.01)

(52) U.S. Cl.
USPC ................ 718/1; 710/260; 710/268; 711/165

(58) Field of Classification Search
USPC ........ 710/260–266; 711/161, 162, 165; 718/1
See application file for complete search history.

(56) References Cited

U.S. PATENT DOCUMENTS

| | | | | |
|---|---|---|---|---|
| 4,831,518 A | * | 5/1989 | Yu et al. | 714/4 |
| 5,428,799 A | * | 6/1995 | Woods et al. | 710/266 |
| 5,787,095 A | | 7/1998 | Myers et al. | |
| 5,842,031 A | | 11/1998 | Barker et al. | |
| 5,857,090 A | * | 1/1999 | Davis et al. | 703/25 |
| 6,421,775 B1 | | 7/2002 | Brock et al. | |
| 6,457,100 B1 | | 9/2002 | Ignatowski et al. | |
| 6,668,308 B2 | | 12/2003 | Barroso et al. | |
| 6,671,792 B1 | | 12/2003 | McAllister | |
| 6,684,343 B1 | | 1/2004 | Bouchier et al. | |
| 6,698,017 B1 | * | 2/2004 | Adamovits et al. | 717/168 |
| 6,725,317 B1 | | 4/2004 | Bouchier et al. | |
| 6,848,003 B1 | | 1/2005 | Arimilli et al. | |
| 6,910,062 B2 | | 6/2005 | Arimilli et al. | |
| 6,918,052 B2 | | 7/2005 | Bouchier et al. | |
| 6,920,519 B1 | * | 7/2005 | Beukema et al. | 710/306 |
| 6,973,517 B1 | | 12/2005 | Golden et al. | |
| 7,007,152 B2 | * | 2/2006 | Pesola et al. | 711/202 |
| 7,080,221 B1 | * | 7/2006 | Todd et al. | 711/161 |
| 7,222,203 B2 | * | 5/2007 | Madukkarumukumana et al. | 710/260 |
| 7,263,590 B1 | * | 8/2007 | Todd et al. | 711/165 |
| 7,281,104 B1 | * | 10/2007 | Tsypliaev et al. | 711/165 |

(Continued)

OTHER PUBLICATIONS

Huang, Wei. Introduction of AMD Advanced Virtual Interrupt Controller. Aug. 2012.*

(Continued)

*Primary Examiner* — Matthew D Spittle

(57) ABSTRACT

A method and system for handling interrupts within a computer system during hardware resource migration are disclosed. In at least some embodiments, the method includes (a) programming an address conversion component so that incoming interrupt signals are directed to a control component rather than to a source processing resource, and (b) accumulating the incoming interrupt signals at the control component. Additionally the method also includes, subsequent to the migration of the partition from the source processing resource to a destination processing resource, (c) sending the accumulated incoming interrupt signals to the destination processing resource, and (d) reprogramming the address conversion component so that further incoming interrupt signals are directed to the destination processing resource.

21 Claims, 3 Drawing Sheets

(56) References Cited

U.S. PATENT DOCUMENTS

| | | | |
|---|---|---|---|
| 7,376,764 B1 * | 5/2008 | Todd | 710/38 |
| 7,383,405 B2 * | 6/2008 | Vega et al. | 711/162 |
| 7,447,820 B2 * | 11/2008 | Raj | 710/260 |
| 7,467,243 B2 * | 12/2008 | Rashid et al. | 710/52 |
| 7,484,208 B1 * | 1/2009 | Nelson | 718/1 |
| 7,533,207 B2 * | 5/2009 | Traut et al. | 710/260 |
| 8,286,162 B2 * | 10/2012 | Neiger et al. | 718/1 |
| 2001/0037426 A1 * | 11/2001 | Pawlowski et al. | 710/260 |
| 2002/0144063 A1 | 10/2002 | Pier et al. | |
| 2003/0009641 A1 | 1/2003 | Arimilli et al. | |
| 2003/0131067 A1 | 7/2003 | Downer et al. | |
| 2004/0268044 A1 | 12/2004 | Heller, Jr. et al. | |
| 2005/0021913 A1 | 1/2005 | Heller, Jr. | |
| 2005/0033889 A1 * | 2/2005 | Hass et al. | 710/260 |
| 2005/0240649 A1 | 10/2005 | Elkington et al. | |
| 2005/0246508 A1 | 11/2005 | Shaw | |
| 2006/0020940 A1 * | 1/2006 | Culter | 718/100 |
| 2006/0031672 A1 | 2/2006 | Soltis et al. | |
| 2006/0095624 A1 * | 5/2006 | Raj et al. | 710/260 |
| 2008/0120515 A1 * | 5/2008 | Ritz et al. | 713/601 |

OTHER PUBLICATIONS

Gordon et al. ELI: Bare-Metal Performance for I/O Virtualization. ACM. Mar. 2012.*

Nakajima, Jun. Enabling Optimized Interrupt/APIC Virtualization in KVM. Nov. 8, 2012.*

Planning Superdome Cofiguration; Building Blocks and Definitions, Glossary, Appendix A, pp. 287-295; Chapter 4, pp. 161-198.

* cited by examiner

METHOD AND SYSTEM FOR HANDLING INTERRUPTS WITHIN COMPUTER SYSTEM DURING HARDWARE RESOURCE MIGRATION

CROSS-REFERENCE TO RELATED APPLICATIONS

Not Applicable

STATEMENT REGARDING FEDERALLY SPONSORED RESEARCH OR DEVELOPMENT

Not Applicable

FIELD OF THE INVENTION

The present invention relates to computer systems and methods of operating such systems and, more particularly, relates to systems and methods for handling interrupts within computer systems.

BACKGROUND OF THE INVENTION

As computer systems have become more complex, with large numbers of processing devices and other hardware resources, it has become possible for one such computer system to operate simultaneously as multiple computers, where each computer has its own operating system. Such is the case in many server computer systems in particular. In such systems, although a customer (or operating system) may perceive a single computer, the portion of the system running as this single computer (a "partition") may be distributed across many different hardware resources that are unaffiliated with one another and/or in any are separately replaceable "Field Replaceable Units" (FRUs).

Today's customers are asking for computer systems that will allow them to increase their return on their investment by improving the utilization of their compute infrastructure. In addition, they are asking for solutions with higher availability, serviceability and manageability. In particular, they are asking for solutions that allow them to be able to replace failing components of a computer system without bringing down or rebooting the computer system. Yet with respect to conventional computer systems such as those discussed above it often is difficult or impossible to shift the utilization of hardware resources, or to replace hardware resources, without bringing down or rebooting the computer systems or at least individual partitions of the computer systems.

One reason why it is difficult to shift the utilization of hardware resources, or to replace hardware resources, without bringing down/rebooting a computer system is that such hardware resources tend to be in close communication with the operating system from the standpoint of interrupt handling. For example, in conventional cellular server architecture, interrupts are sent to processing units via an addressing mechanism in which unique system-wide addresses are ascribed to unique processing devices. According to this mechanism, the addresses of the processing devices are exposed directly to and used by the operating system. Because the addresses are unique and cannot be changed, and because the operating system is directly informed of all of the addresses, it is difficult if not impossible to modify or replace the processing devices without entirely stopping operation of the operating system. Further complicating the matter is that some operating system versions additionally have internal constraints that prevent the on-line deletion of some particular processing devices.

Given these difficulties, full software-level machine virtualization is used to enable shifting (migration) or replacement of hardware resources without having to take down and/or reboot the computer system. However, while such virtualization is possible, the use of full machine virtualization tends to result in lower performance (e.g., in terms of processing speed), fails to provide electrical isolation, and is tied to specific operating systems, which in turn raises consistency and support issues as the operating systems are updated.

For at least the above reasons, it would be advantageous if an improved method and system for handling interrupts could be developed that, in at least some embodiments, was consistent with the shifting and/or replacement of hardware resources such as processing devices within a computer system. Further, it would be advantageous if in at least some embodiments such improved method and system for handling interrupts was consistent with the shifting/replacement of hardware resources in a manner that did not require bringing down/rebooting of the overall system (or system partition).

SUMMARY OF THE INVENTION

In at least some embodiments, the present invention relates to a method of handling interrupts during a migration of an operative portion of a computer system from a source processing resource to a destination processing resource. The method includes (a) programming an address conversion component so that incoming interrupt signals are directed to a control component rather than to the source processing resource, and (b) accumulating the incoming interrupt signals at the control component. Additionally the method also includes, subsequent to the migration of the partition from the source processing resource to the destination processing resource, (c) sending the accumulated incoming interrupt signals to the destination processing resource, and (d) reprogramming the address conversion component so that further incoming interrupt signals are directed to the destination processing resource.

Further, the present invention in at least some embodiments relates to a method of operating a computer system. The method includes (a) determining that an operative portion of the computer system should migrate from a first hardware resource to a second hardware resource, and (b) configuring a first component of the computer system so that first interrupt signals are directed to a temporary storage component at which the signals are stored. The method further includes (c) migrating the operative portion of the computer system from the first hardware resource to the second hardware resource, and (d) further configuring at least one of the first component and a second component of the computer system so that the stored first interrupt signals and second interrupt signals are directed to the second hardware resource.

Additionally, the present invention in at least some embodiments relates to a system for handling interrupts within a computer system having first and second processing devices. The system includes at least one address conversion device coupled at least indirectly to each of the first and second processing devices at least at different respective times, and an additional control component that is capable of communications with the at least one address conversion device. Further, the additional control component includes at least one device that is capable of accumulating interrupt signals and, during a migration of a first operative portion of the computer system from the first processing device to the second processing device, the additional control component accumulates incoming interrupt signals.

DETAILED DESCRIPTION OF THE PREFERRED EMBODIMENT

Figure 1:
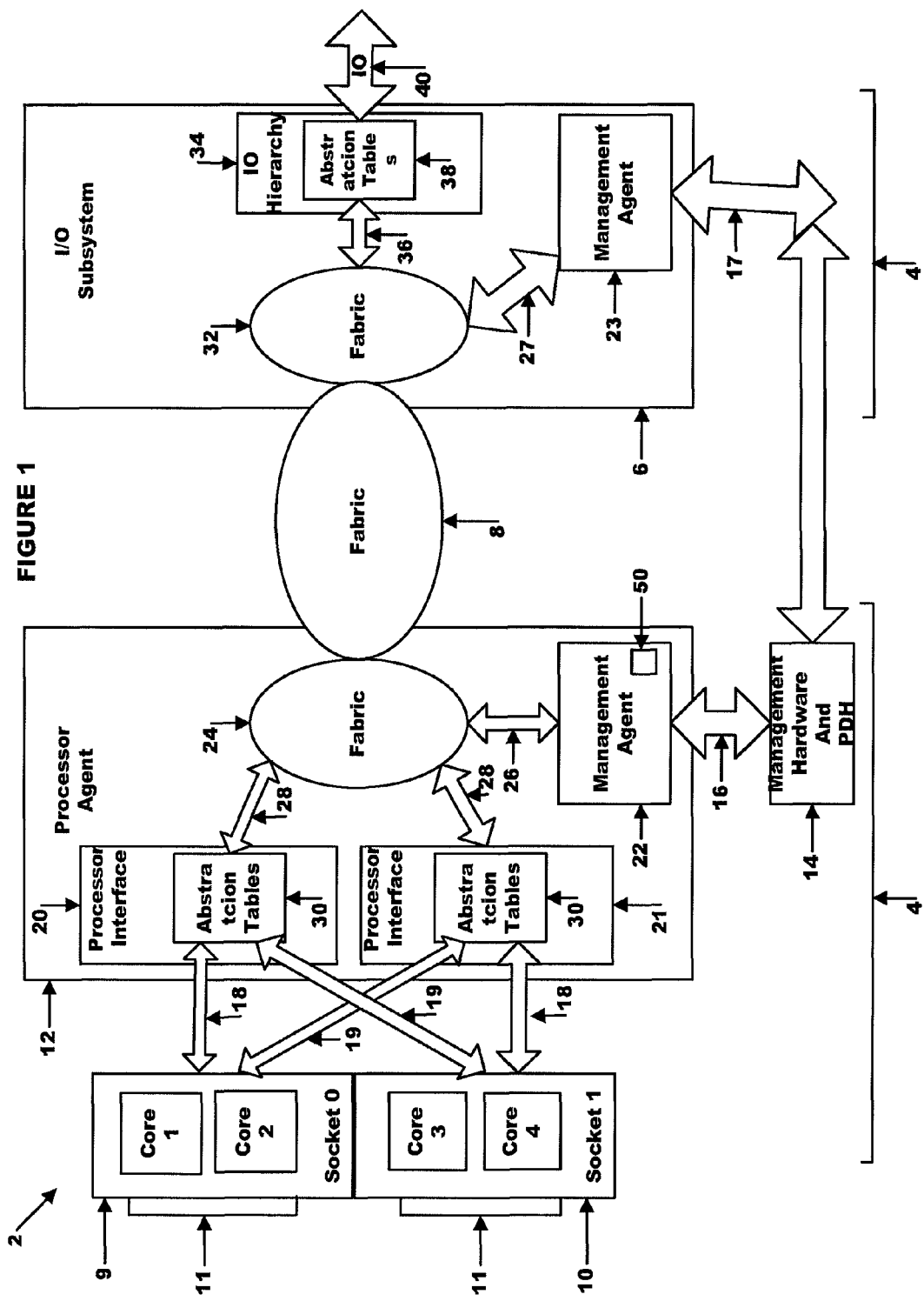
FIG. 1 shows in schematic form components of an exemplary computer system in communication with each other via a fabric in accordance with one embodiment of the present invention.

Referring to FIG. 1, components of an exemplary multi-processor computer system 2 are shown in a simplified schematic form, in accordance with at least one embodiment of the present invention. As shown, the computer system 2 in the present embodiment in particular includes a partition 4 that includes first and second processor sockets 9 and 10, respectively, each of which has multiple processors or cores 11. Additionally, the partition 4 includes a processor agent (PA) 12, critical resources 14, and an input/output (I/O) subsystem 6. As shown, a first fabric 8 of the computer system 2 allows for communications to occur between the I/O subsystem 6 and the rest of the partition 4 (particularly the PA 12). In other embodiments, the partition 4 can include additional components (not shown), for example, memory (e.g., random access memory or RAM) blocks, and power management controllers.

Further, an operating system (not shown) runs in the partition 4 on multiple processors 11. Instructions of the operating system are executed by one or more of the processors 11, and the operating system is also capable of being influenced in terms of its operation by the I/O subsystem 6. On a hardware level, the partition 4 and the I/O subsystem 6 can be understood to be formed, for example, on separate printed circuit boards that can be plugged into, and connected by, a backplane on which is formed, or to which is coupled, the fabric 8. In other embodiments, the I/O subsystem 6 and the partition 4 can be formed on single or multiple printed circuit boards. Each of the PA 12 and the I/O subsystem 6 can be formed on their own respective Application Specific Integrated Circuit (ASIC) chips, which are plugged into the printed circuit board of the partition 4. Although the computer system 2 of the present embodiment includes only the single partition 4, it is nevertheless intended to be representative of a wide variety of computer systems having an arbitrary number of partitions and/or circuit boards. For example, in other embodiments, more than one partition can be present, and the various partitions can all be coupled to one another by way of the fabric 8.

In at least some embodiments, the computer system 2 can be an sx1000 super scalable processor chipset available from the Hewlett-Packard Company of Palo Alto, Calif., on which are deployed hard partitions, such as the partition 4 (also known as "nPars"). Hard partitions allow the resources of a single computer system to be divided among many enterprise workloads and to provide different operating environments (e.g., HP-UX, Linux, Microsoft Windows Server 2003, OpenVMS) simultaneously. Such hard partitions also allow computer resources to be dynamically reallocated. Although the computer system 2 can be the super scalable processor chipset mentioned above, it need not be such a chipset and instead in other embodiments can also take a variety of other forms.

With respect to the first fabric 8 in particular, that component serves as an intermediary between the PA 12 (and thus the processor sockets 9, 10) and the I/O subsystem 6 of the partition 4 by which requests and messages to and from any of the cores 11 from and to the I/O subsystem 6 are communicated. The first fabric 8 typically routes signals based upon fabric addresses provided to the fabric, where the fabric addresses are converted to and from physical addresses when the signals are leaving or entering the fabric. The PA 12 and the I/O subsystem 6 are connected to the first fabric 8 during configuration, when those components of the partition 4 are installed on the computer system 2. Although not shown, the computer system 2 can also in other embodiments include one or more additional partitions, in which case the first fabric 8 also allows for communications between similar components of those partitions, and/or even possibly between the components of different partitions.

Turning to the I/O subsystem 6 portion of the partition 4, that subsystem includes an I/O hierarchy 34, a management agent (MA) 23 and a third fabric 32, where the third fabric is in communication with the first fabric 8 and also in communication with the I/O hierarchy as indicated by a communication link 36. The I/O subsystem 6, and particularly the I/O hierarchy 34, is capable of being connected to a wide variety of input and output devices via one or more communication links 40 including, for example, input devices such as a keyboard, a computer mouse, a joystick or any other device used to enter information into the computer system 2, output devices such as a monitor, a touch-screen, a printer, a projector, or any other device used to present information from the computer system to the user or to otherwise output information, and/or any other hardware device that can be directly or indirectly coupled to the computer system 2 (including, for example, one or more devices for interfacing/connecting to one or more wired or wireless networks), Often, the I/O hierarchy 34 is an I/O controller managing the various I/O devices connected to the I/O subsystem 6. Although the present embodiment shows the I/O subsystem 6 as including only the I/O hierarchy 34, the third fabric 32, and the MA 23, in other embodiments the subsystem can have other components as well.

The MA 23, in particular is a hardware component that serves as an intermediary by which signals are routed between the critical resources 14 (as shown by communication link 17) and other input/output devices 40 of the computer system 2 via the third fabric 32. With respect to the third fabric 32, it is a hardware device formed on (or connected to) the I/O subsystem 6, which directs signals from the I/O subsystem 6 to the first fabric 8 and vice versa. As for the I/O hierarchy 34, that hardware device in particular serves as an intermediary capable of routing virtualized interrupt signals among many other things including for example, programmed I/O read responses and direct memory access (DMA) read/write requests.

In general, signals (in a "virtualized" form) are received from the I/O devices via the links 40 and converted or mapped into fabric signals (in a "real" form) that can be routed to the PA 12 and ultimately to appropriate ones of the cores 11 of the sockets 9, 10. More particularly, the I/O hierarchy includes an abstraction table 38 that converts the incoming virtualized interrupt signals into such fabric signals, which are then communicated from the abstraction table to the PA 12 by way of the third fabric 32 of the I/O subsystem 6 and the first fabric 8. Additionally, the I/O hierarchy 34 and the MA 23 are in communication with the third fabric 32, as indicated by communication links 36 and 27, respectively and the third fabric is in communication with the second fabric 24 via the first fabric 8.

As will be discussed further below, such fabric signals generated by way of the abstraction table 38 are not suitable for recognition and/or processing by the operating system, and typically include fabric address information, yet retain the additional virtual interrupt identification information. The address information is indicative of the fact that the signals are interrupt signals, as well as contains the exact fabric physical addresses (e.g., of the cores 11) to which the interrupt signals should be sent. It also includes information that can be used by the PA 12 to further determine such physical addresses to which the signals should be sent. At the PA 12, another abstraction table, as discussed in more detail below, converts the fabric interrupt address back into the virtual interrupt address suitable for recognition and/or processing by the operating system. As for the additional retained virtual interrupt identification information, such information in the present embodiment includes two portions (which more particularly can be referred to as ID information and extended ID or "EID" information), which are passed on by the PA 12 to each of the active cores 11, and which is utilized by the cores 11 to determine whether they should process any given interrupt signal.

Turning to the processor sockets 9, 10, these are intended to serve as an operating platform for multiple hardware and software components. In the present embodiment, each of the processor sockets 9, 10 includes a respective pair of the processors or cores (each of which can be a central processing unit) 11. Further, each of the cores 11 has one or more registers to store information. As discussed further below, each of the cores 11 that is actively operating (e.g., performing one or more threads) is programmed in its register(s) by firmware to include one or more codes, which are referred to as logical identifiers ("LIDs"). Each LID corresponds to a respective thread of the respective core 111 and determines whether the given core/thread will respond to a given interrupt signal provided to it based upon a comparison of the LID with the additional interrupt identification (ID/EID) information mentioned above. In other embodiments, the processor sockets 9, 10 can also include additional components, for example, memory controllers (MCs) or hardware components to facilitate communication between the cores 11 and other resources within the computer system 2.

Typically, the cores 11 located on the respective processor sockets 9, 10 also (like the PA 12 and the I/O system 6) are formed by way of very large-scale integration (VLSI) chips that are coupled to the respective processor sockets by way of electrical connectors, and are intended to be representative of a wide variety of central processing units. For example, in the present embodiment, the cores 11 are Itanium processing units as are available from the Intel Corporation of Santa Clara, Calif. In other embodiments, one or more of the cores 11 can take other forms including, for example, Xeon or Celeron processors also from the Intel Corporation. In alternate embodiments, one or more of the cores can be another type of processing unit other than those mentioned above including a wide variety of processing units available from the Advanced Micro Devices (AMD) of Sunnyvale, Calif. Additionally, different cores on a given processor socket, on different processor sockets, and/or on different partitions need not be the same but rather can differ from one another in terms of their types, models, or functional characteristics. While in the present embodiment each of the processor sockets 9, 10 includes only its respective pair of the processors 11, in other embodiments more than two cores (e.g., up to sixteen cores) or less than two cores (e.g., as few as one core) are on each socket. Additionally, although the present embodiment has the two processor sockets 9, 10 on the partition 4, other embodiments can have only a single socket or more than two sockets as well.

As for the PA 12 located on the partition 4, it serves as a mediator for facilitating communication between the cores 11 on the processor sockets 9, 10 and other components of the computer system 2. The PA 12 can be an integrated circuit (IC) chip such as the EA780 scalable node controller as available from the Hewlett-Packard Company albeit, in other embodiments, the PA 12 can be another type of IC chip or take other form(s) as well. In the present embodiment, the PA 12 includes several subcomponents, namely, processor interfaces 20 and 21, a management agent (MA) 22 and a second fabric 24. The processor interfaces 20, 21 and the MA 22 each are in communication with the second fabric 24, as indicated by communication links 28 and 26, respectively, and the second fabric additionally is in communication with the first fabric 8. Although the present embodiment has only a single PA 12, it is intended to be representative of a wide variety of computer systems having more than one PA as well.

More particularly with respect to the processor interfaces 20, 21 of the PA 12, those components are in communication with the processor sockets 9, 10 as illustrated by way of a communication links 18, 19 and collectively serve as an intermediary by which signals directed from the processor sockets are provided to the first fabric 8 and/or the MA 22 by way of the second fabric 24. As shown, the processor interface 20 is in communication with the respective sockets 9 and 10 by way of two of the respective communication links 18 and 19, while the processor interface 21 is in communication with the respective sockets 10 and 9 by way of another two of the respective communication links 18 and 19. Further as shown, each of the processor interfaces 20, 21 includes another abstraction table 30 that converts the aforementioned fabric interrupt signals generated by the abstraction table 38 into routable interrupt signals having physical addresses, such that the interrupt signals can be directed to specific ones of the cores 11, as will be discussed further below. Additionally, the abstraction tables 30 provide socket-level granularity, tracking different sockets and signals arising therefrom.

Although only two hardware abstraction tables 30 (one per processor interface 20, 21) are shown in FIG. 1, depending upon the embodiment the PA 12 can have multiple such abstraction tables. Further, although not shown, in other embodiments, the PA 12 can have additional components including, for example, source address decoders, caching agents and cache coherency controllers. Also, while the present embodiment envisions the processor interfaces 20, 21 as being coupled to the I/O subsystem 6 by way of both the first fabric 8 and the second fabric 24, in alternate embodiments, the processor can be directly coupled to the I/O subsystem 6 merely by way of the second fabric 24.

As for the management agent (MA) 22, it is a hardware component that serves as an intermediary by which signals are routed between the critical resources 14 and other components (e.g., the processor sockets 9, 10, the first fabric 8 and the I/O subsystem 6) of the computer system 2 via the second fabric 24. Additionally, the MA 22 has several other purposes relating to the identification, configuration, controlling and observation of the partition 4 and its resources (e.g., those of the cores 11 being utilized by the partition or otherwise available to the partition). Further, the MA 22 also serves to manage how interrupt signals are handled, particularly at times during which one or more of the cores 11/sockets 9, 10 are being migrated, as discussed further below.

More particularly, the MA 22 includes a forwarding table 50 that is capable of storing all the LIDs within a socket and maintaining information about whether a core corresponding to a particular LID has been migrated (or otherwise not migrated) or is in the process of migrating. In this regard, the MA 22 by virtue of the forwarding table 50 is able to manage and even accumulate interrupts under certain operational circumstances. Additionally, the MA 22 is capable of providing core level addressing granularity as opposed to the abstraction tables 30 that provide socket-level granularity. That is, the MA is capable of keeping track of whether a given core of a set of cores (e.g., the cores of one of the sockets 9, 10) has been migrated, and act accordingly in directing interrupts as discussed further below.

As for the critical resources 14, these resources are accessible by the MA 22 as indicated by a communication link 16, and are intended to be representative of a variety of resources within the computer system 2 that are necessary for performing various operations, some of which can be referred to as Processor Dependent Hardware (PDH). For example, in at least some embodiments, certain of the critical resources 14, as well as firmware, when working in conjunction with the MA 22, form a complex management intelligence (CMI) capable of identifying, managing, configuring and observing the partition 4 including other resources within the computer system 2. Such a complex management intelligence generally operates in isolation from the operating system running on the partition 4, such that the operating system is unaware of the complex management intelligence.

Given the above description of the computer system 2, normal handling of interrupt signals (e.g., at times when hardware resources such as the processors 11 that are being utilized by the partition 4 are not being migrated) proceeds as follows. In particular, virtual interrupt signals received by the I/O subsystem 6 off of the links 40 are converted, by way of the abstraction table 38, into interrupt signals having both fabric address information and additional interrupt identification (e.g., ID/EID) information. These interrupt signals in turn are communicated by way of the fabrics 24, 8, and 32 to one of the processor interfaces 20 or 21 identified by the abstraction table 38. At the processor interface 20 or 21, the abstraction table 30 reconverts the interrupt signals into virtual routable interrupt signals having physical address information as well as the additional interrupt identification information. These routable interrupt signals are then provided to each of the cores 11 of the socket (e.g., the socket 9) that is currently being utilized by the partition 4 and was addressed by the fabric address information for the interrupt. At each of the cores 11, the additional interrupt identification information is compared with each LID corresponding to each thread of each core. When there is a match between the additional interrupt identification information a given LID, the core/thread to which that LID pertains then handles the interrupt.

Due to the use of the above-described virtualized addressing scheme, the computer system 2 handles interrupts in such a manner that the operating system of the partition 4 is shielded from any knowledge about the particular hardware that is handling the interrupts. Further, both due to this general scheme as well as a process described below in more detail with respect to FIGS. 2-3, the computer system 2 further is capable of operating in a manner such that the interrupt handling operations of the computer system do not limit or restrict the ability to add, delete, or otherwise modify hardware resources (e.g., the processors 11) that are being utilized by the partition 4. Rather, when such resource adjustments are performed, the operating system and/or applications supported by the operating system can continue to handle interrupts without being disrupted or influenced by (and, indeed, without having any knowledge of) such resource adjustments. Thus, at least some embodiments of the present invention are advantageous in that they allow the unimpeded functioning of the operating system (and application supported thereby) in terms of handling interrupts, while at the same time allowing adjustments to the hardware resources of the partition 4 underlying the operating system as the needs (e.g., processing power) of the operating system (or its applications) vary over time, and/or in the event that one or more such resources experience a fault or failure.

Figure 2:
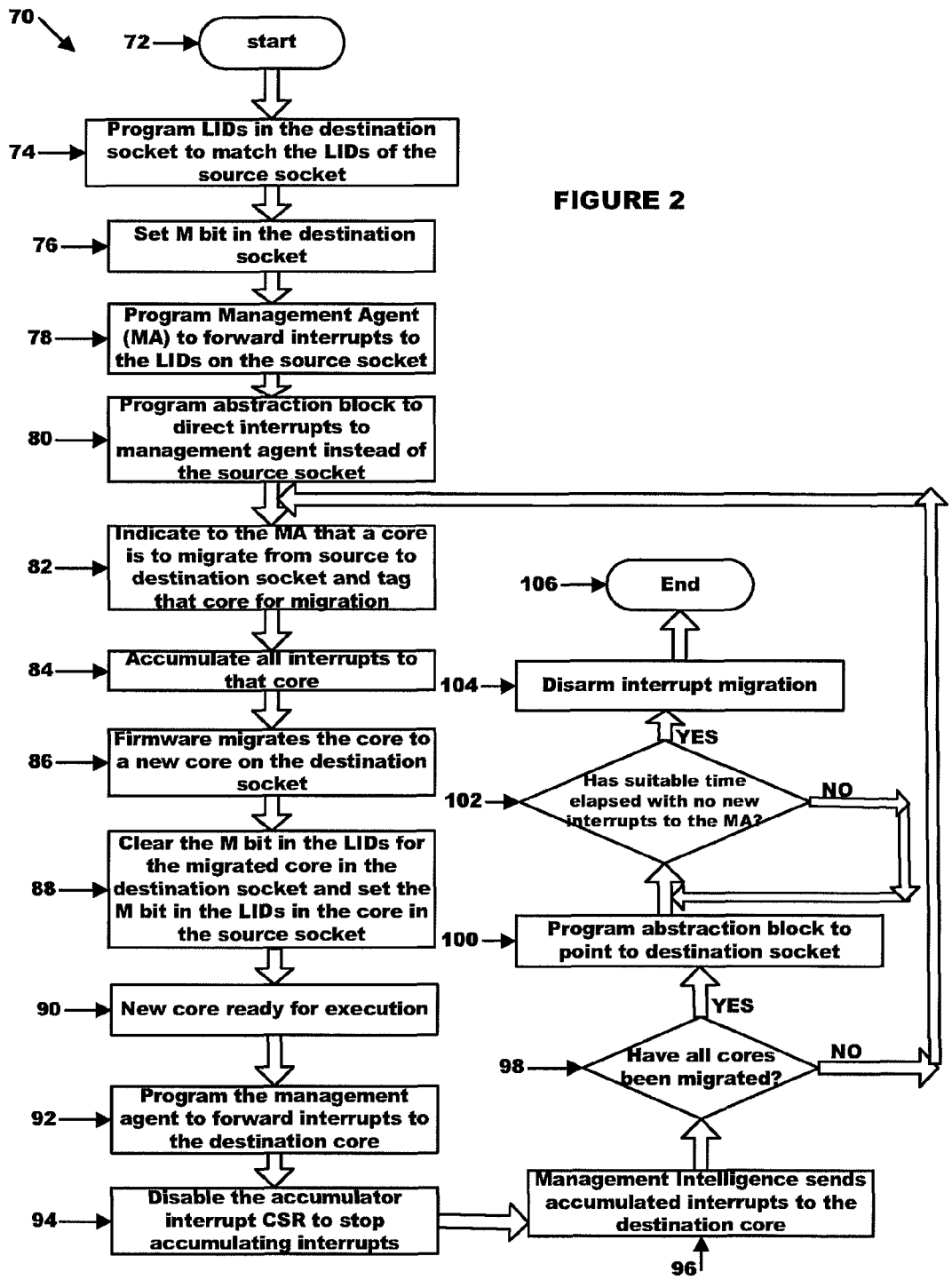
FIG. 2 is a flowchart showing in further detail exemplary steps of operation of the computer system of FIG. 1 relating to a process involving the handling of interrupts during migration of a hardware resource, in accordance with at least one embodiment of the present invention.
Figure 3A:
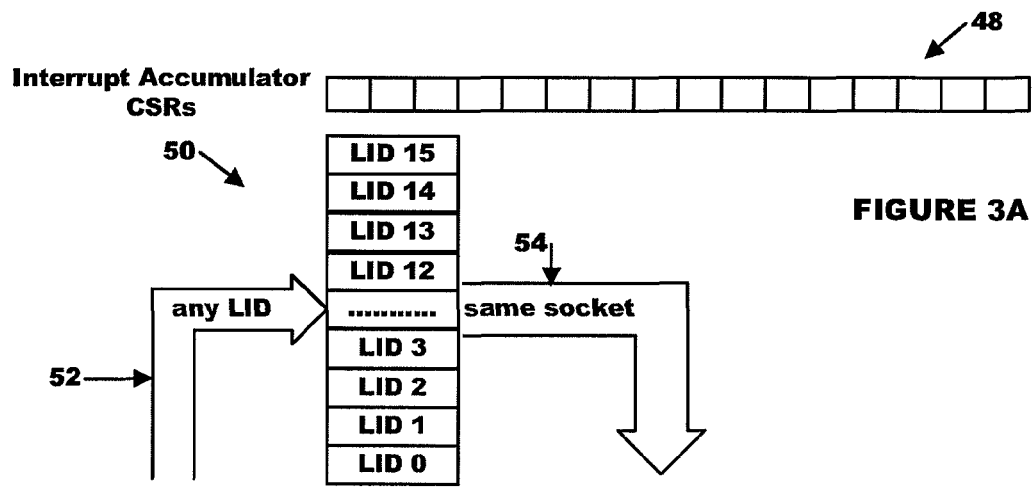
FIGS. 3A-3C illustrate in schematic form how interrupts are handled during three stages of the process of FIG. 2, in accordance with at least one embodiment of the present invention.
Figure 3B:
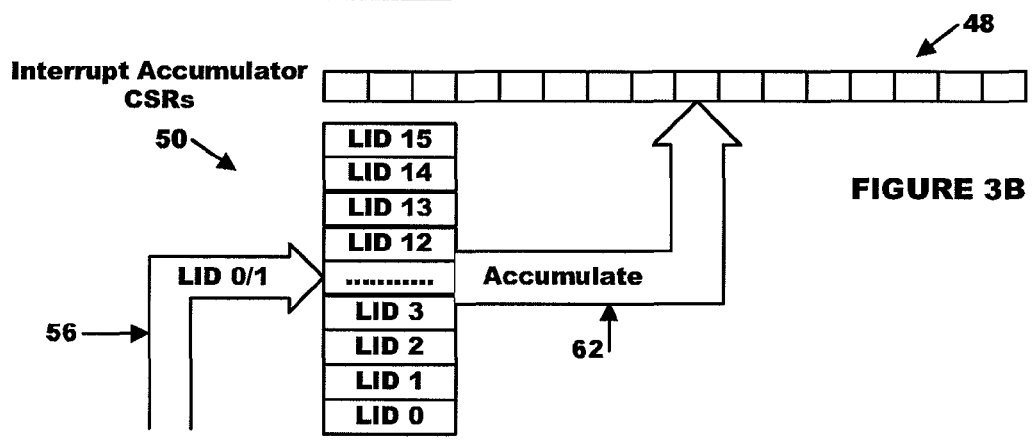

Turning to FIG. 2, a flowchart 70 is provided that shows exemplary steps of operation of the computer system 2 of FIG. 1 that particularly relate to a process of handling interrupts during a migration of a hardware resource being utilized by the partition 4, in accordance with at least one embodiment of the present invention. Additionally, as a supplement to FIG. 2, FIGS. 3A-3C graphically illustrate the flow of interrupt signals at three different stages of the process represented by FIG. 2. For purposes of the present example, it is assumed that the partition 4 in particular is switching from utilizing the cores 11 of the socket 9 to utilizing the cores of the socket 10, and thus a migration from the socket 9 to the socket 10 is occurring.

Prior to beginning the process represented by the flowchart 70, all interrupt signals are handled as discussed above with respect to FIG. 1. That is, all interrupt signals received at the I/O system 6 via I/O links 40 are converted from partition virtual interrupt signals to fabric (physical) signals by the abstraction table 38, and communicated to one of the processor interfaces 20 or 21 of the PA 12 as indicated by the abstraction table 38, at which the signals are reconverted to virtual and routable interrupt signals that in turn are provided to the cores 11 of the socket 9 and handled by those cores based upon a comparison of those signals with the LIDs of those cores. In contrast to a later stage of operation as discussed below, this process in particular occurs without any involvement by any interrupt accumulator control status register (CSR) 48 associated with the MA 22.

Upon beginning the process represented by the flow chart 70 at a step 72, at a step 74 firmware of the computer system 2 (e.g., associated with the MA 22 and/or the critical resources 14) causes the LIDs that are stored on the registers of the cores 11 of the source socket (socket 9) to be copied onto the registers of the cores 11 of the destination socket (socket 10). By copying the LIDs, the destination socket 10 is configured to respond to interrupts in the same manner as the source socket 9. Further at the step 76 an additional respective bit, for example, the migration bit (the "M bit") on each of the registers of each of the cores 11 of the destination socket is set, indicating that those cores are in the process of being migrated and indicating (as further discussed below) that those cores are currently under the control of the CMI. Next, at a step 78, the firmware programs the MA 22 to forward incoming interrupt signals received from the abstraction table 38 to the cores 11 of the source socket 9 rather than those of the destination socket 10. The performance of this step does not yet result in interrupt signals being sent to the source socket 9; rather, it merely results in reconfiguration of the MA 22. This manner of operation is figuratively illustrated by FIG. 3A, which shows all incoming interrupt signals (as represented by an arrow 52) corresponding to any LID of any thread of any of the cores 11 of the socket 9 being routed by the forwarding table within the MA 22 (as represented by a reference numeral 50) directly back to the cores of that socket (as represented by an arrow 54).

Subsequently, at a step 80, the firmware reprograms each of the abstraction tables 30 and 38 of the processor interface 20 and the I/O hierarchy 34, respectively. More particularly, the firmware reprograms each of these abstraction tables 30, 38 so that the interrupt signals are directed to the MA 22 instead of to the original (source) socket 9. With respect to the abstraction table 30, this reprogramming results in updated conversion information such that addresses no longer pertain to routing addresses associated with the cores 11 of the socket 9, but rather pertain to routing addresses directed toward the MA 22. Due to the re-programming at the step 80, interrupt signals begin arriving at the MA 22. (However, interrupts that are already in flight and interrupts from other abstraction tables in the computer system 2 that have not yet been reprogrammed still arrive at the socket 9.) By directing all interrupt signals to the MA 22, the MA 22 gains control over the routing of interrupt signals such that it can (independently of any operating system involvement) prevent interrupt signals from being provided to the source socket 9 and otherwise govern the transmission of the interrupt signals.

In the present embodiment, even though it is desired to migrate from the entire socket 9 to the entire socket 10, and thus to migrate from all of the cores 11 of the socket 9 to all of the cores of the socket 10, such process cannot be performed on a socket-by-socket basis. Migration of multiple cores simultaneously could risk crashing the computer system 2 or stalling processes. Rather, in the present embodiment, it is desired to only migrate a single core at a time, such that the socket migration process necessarily involves the migration of multiple cores in series. For this reason, several additional steps 82-98 of the flowchart 70 relating to the migration of individual cores of the sockets are shown to be performed on a repeated basis. More particularly, in the present example in which the partition 4 is migrating from the two cores 11 (labeled "Core 1" and "Core 2") of the socket 9 to the two cores (labeled "Core 3" and "Core 4") of the socket 10, the steps 82-98 can be repeated on two occasions, namely, a first occasion involving the migration from the Core 1 to the Core 3, and a second occasion involving the migration from the Core 2 to the Core 4.

More particularly with respect to the step 82, at this step firmware provides an indication to the MA 22 that one of the cores 11 is to be migrated. For example, during the first iteration of this step in which the Core 1 of the socket 9 is being migrated to the Core 3 of the socket 10, an indication is provided to the MA 22 that the partition 4 is intending to switch between those two cores. In particular, the MA 22 includes register(s) (not shown) that are capable of identifying the core to be migrated and also providing the addresses of both the source and the destination sockets of that core. By virtue of accessing a particular ID/EID within the register(s), it can be determined if the core corresponding to the accessed ID/EID is being migrated. Also, the destination address of the migrating core can be retrieved.

Once the abstraction blocks have been modified in the step 80 and the MA 22 has been alerted to the migration of a given core, then subsequently beginning at a step 84 all interrupt signals originally destined for the source core are now accumulated by the MA, particularly within the interrupt accumulator CSR 48 of the MA. Such operation is figuratively illustrated by FIG. 3B, which shows that a portion of all incoming interrupt signals (as represented by an arrow 56) received from the I/O subsystem 6 are provided to an interrupt accumulator CSR 48 rather than provided to any socket. The interrupt signals that are accumulated, namely, those corresponding to LIDs 0 or 1, are only a subset of all possible incoming interrupt signals. This is because, as of the first iteration of the step 84, only the first core of the socket 9 (e.g., Core 1) is being migrated and so only the LIDs corresponding to threads of that core are accumulated. In contrast, the LIDs 2-15 corresponding to threads of the other core of that socket (e.g., Core 2) continue to flow to that core, forwarded from the MA 22. This manner of accumulation of interrupts within the interrupt accumulator CSR 48 continues until no more accumulation is required. Additionally, different interrupt accumulator CSR(s) (other than the CSR 48) can be used for different types of interrupts. For example, global shared memory (GSM) interrupts can be accumulated in a different CSR than intra-partition interrupts. Further, in addition to accumulating interrupts, each of the interrupt accumulator CSR(s) can be understood to include vector and delivery mode information associated with each interrupt.

Once the MA 22 by way of its interrupt accumulator CSR 48 is accumulating the interrupt signals that otherwise would have been destined for the subject core undergoing migration (e.g., the Core 1 of the socket 9), the migration of that core can then be performed at a step 86. In the present example, in which the Core 1 of the socket 9 is being migrated to the Core 3 of the socket 10, the migration of the step 86 involves shifting all current state/status information and all relevant software threads from the Core 1 of the socket 9 to the Core 3 of the socket 10. That is, to migrate the core from the source socket 9 to the destination socket 10, both the software threads and the architected state of that core (including, for example, the registers) are frozen and captured under the control of the firmware and moved to the replacement core. Once the migration of the core has been completed, then at the step 88 the M bits on the register(s) of the source Core 1 of the source socket 9 are set and the M bits on the register(s) of the destination Core 3 of the destination socket 10 are cleared. This indicates that the source Core 1, which is now intended to be offline, is under the governance of the CMI, while the replacement Core 3 toward which the migration has occurred is no longer under the governance of the CMI.

Upon completion of the migration process from the Core 1 of the source socket 9 to the Core 3 of the destination socket 10, the replacement Core 3 is ready for operation/execution, as indicated by a step 90, and in particular is ready to service interrupts. Consequently, at a step 92, the firmware reprograms the MA 22 of the source socket to route interrupts to the replacement Core 3. Further, subsequent to the reprogramming of the MA 22 at a step 94 the firmware also disables the interrupt accumulator CSR 48. As a result of the steps 92 and 94, interrupts are no longer accumulated by the interrupt accumulator CSR 48. From this point onwards, any incoming interrupts to the MA 22 will be directed via the second fabric 24 to the replacement Core 3 on the destination socket 10. Additionally, at a further step 96 the interrupts that were accumulated by the interrupt accumulator CSR 48 are further forwarded one-by-one to the replacement Core 3 on the destination socket 10 via the second fabric 24 of FIG. 1.

Figure 3C:
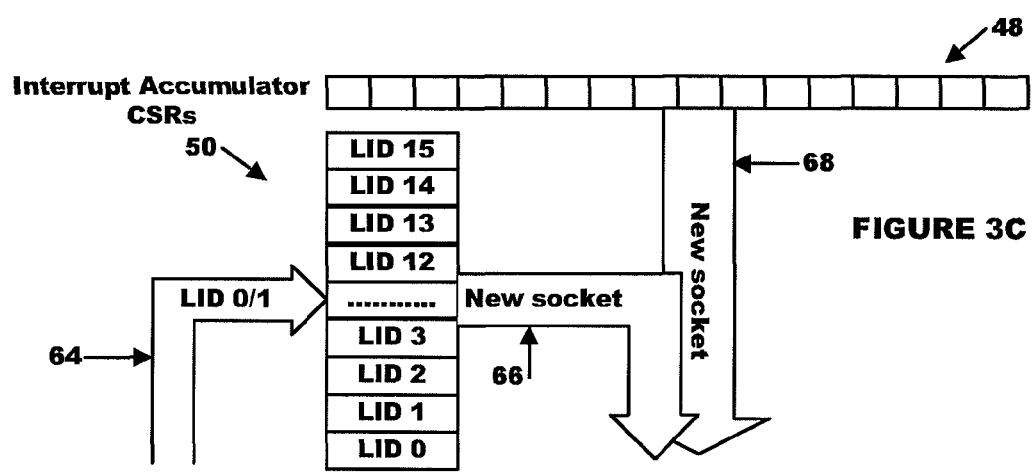

The performance of the steps 92-96 is represented by FIG. 3C, which shows that newly-received interrupts (as represented by an arrow 64) corresponding to the LIDs 0, 1 of the replacement Core 3 on the socket 10 are in fact routed by the forwarding table 50 to that replacement core on that socket (as represented by an arrow 66), and also shows that all accumulated interrupts are routed from the CSR 48 to that socket (as represented by an arrow 68). Further, it should be noted that the routing/forwarding of the accumulated interrupts relative to one another and to newly-received interrupts need not occur in any particular order. Rather, the forwarding and handling of these interrupts can occur in any order, and in particular can occur in an order differing from that in which the interrupts were received from the I/O subsystem 6 or other processor cores, allowing for providing greater flexibility and reliability of the process. For example, the accumulated interrupts can be sent subsequent to reprogramming the abstraction tables 30 and 38 in a step 100 as described below.

Upon completion of the step 96, at a step 98 the firmware determines whether all cores that should have been migrated have in fact been migrated. In the present example in which the two Cores 1 and 2 of the socket 9 are being migrated to become the two Cores 3 and 4 of the socket 10, the above-described completion of the migration of the Core 1 to the Core 3 does not complete the migration process, but rather the steps 82-98 need to be repeated with respect to the migration of the Core 2 to the Core 4. Consequently, in this circumstance, the process returns from the step 98 to the step 82. However, once all of the cores that should have been migrated have in fact been migrated (e.g., such that the partition 4 has migrated from the entire socket 9 to the entire socket 10), the process advances to a step 100.

At the step 100, the firmware again reprograms each of the abstraction tables 30 and 38 of the processor interface 20 and the I/O hierarchy 34, respectively. More particularly, the firmware reprograms each of these abstraction tables 30, 38 so that the interrupt signals are directed to the destination socket 10 that includes the replacement Cores 2 and 4. With respect to the abstraction table 30, this reprogramming results in updated conversion information such that virtual interrupt addresses now pertain to routing addresses associated with the cores 11 of the socket 10, rather than to the MA 22. In particular, the destination address programmed into the abstraction table 30 corresponding to a previously virtual interrupt address now points to the new socket 10 instead of the old socket 9.

Upon completion of the step 100, a determination is then made as to whether the interrupt migration process can be terminated in the MA 22 as indicated by the step 102. If such is determined to be the case at the step 102, then the process is terminated at a step 104 and then the process is ended at a step 106. However, if such is not yet determined to be the case at the step 102, then the process loops back and repeatedly considers the issue. The basis for whether the interrupt migration process can be terminated can vary depending upon the embodiment. In the present embodiment as indicated in the step 102, for example, the interrupt migration process can be terminated once a pre-determined fabric timeout period has elapsed. In another embodiment (not shown), flags indicating the absence of any interrupts within the second fabric 24 for a pre-determined time period can be set to indicate the termination of the interrupt migration process. Also, depending upon the embodiment, if a particular condition has occurred, it is possible for the computer system 2 to abort the entire migration process at this late date and reverse migrate the socket/cores that were migrated (e.g., switch the partition 4 back to using the Cores 1 and 2 of the socket 9).

While the process described above with respect to FIGS. 2 and 3A-3C constitutes one example of how hardware resources utilized by the partition 4 within the computer system 2 can be migrated in a manner consistent with the proper handling of interrupts, and in a manner that does not require rebooting of the computer system or otherwise affect the operating system (or other applications) running on the partition, the present invention is also intended to encompass a variety of other processes, including modifications and/or refinements of the above-described processes.

Likewise while the computer system 2 shown in FIG. 1 is one example of a computer system in which processes such as that of FIGS. 2 and 3A-3C can be performed, the present invention is also intended to encompass a variety of other computer systems having different hardware resources and other features than that of the computer system 2 including, for example, a computer system having more than one partition, more or less than two sockets, and any arbitrary number of cores. Additionally, the printed circuit board(s) on which the partition 4 and the I/O subsystem 6 are formed can be understood to mean a module, a blade or possibly even a cell in other embodiments. Also, each of the hardware components of the computer system 2 can potentially be formed of Application Specific Integrated Circuit (ASIC) chips, Very Large Scale Integration (VLSI) chips and/or Field Programmable Gate Array (FPGA) chips.

The particular process steps and stages employed above to migrate interrupts and cores from a source socket to a destination socket, the programming of the various hardware components, and other features can all be varied depending upon the type/needs of the computer system being used and the applications being executed. For example, while the above description of the operation of the computer system 2 primarily envisions the handling of interrupts that are received by the I/O subsystem 6 via the communication links 40, it should be understood that it is also possible for interrupts to be provided to the computer system 2 (or variations thereof from other sources including, for example, one or more of the cores 11 themselves, and/or peripherals of other sorts including certain of the critical resources 14 (e.g., the PDH). In such cases, the interrupts can be handled in the same manner as that described above, or at least in manners similar or analogous to that described above.

Further for example, supposing that interrupts are provided from another core of another socket other than the sockets 9 and 10, such interrupts during normal operation (e.g., in the absence of a migration of cores) can be routed by the abstraction table 30 of the processor interface 20. At the same time, such interrupt signals can be re-virtualized by that same abstraction table for routing to an appropriate thread of an appropriate one of the cores 11 (presumably not the same core that issued the interrupt). Further, given the presence of such interrupts, the process represented by the flowchart 70 can again be performed allowing for the interrupts to be handled during a migration between the cores 11 of the sockets 9 and 10.

It is specifically intended that the present invention not be limited to the embodiments and illustrations contained herein, but include modified forms of those embodiments including portions of the embodiments and combinations of elements of different embodiments as come within the scope of the following claims.

We claim:

1. A method of handling interrupts during a migration of an operative portion of a computer system from a source processing resource comprising processors associated with respective logical identifiers to a destination processing resource comprising respective processors, the method comprising:

programming an address conversion component so that incoming first virtual interrupt signals are directed to a control component rather than to the source processing resource;

accumulating the first virtual incoming interrupt signals at the control component;

associating the logical identifiers associated with respective ones of the processors of the source processing resource with particular ones of the processors of the destination processing resource; and subsequent to the migration of the operative portion of the computer system from the source processing resource to the destination processing resource, sending the accumulated first virtual incoming interrupt signals to the destination processing resource, wherein the sending comprises converting the first virtual interrupt signals into physical interrupt signals comprising first respective physical address information and respective interrupt identification information, routing the physical interrupt signals over a fabric network, converting the routed physical interrupt signals into second virtual interrupt signals comprising second respective virtual address information and the respective interrupt identification information, and delivering the second virtual interrupt signals to the destination processing resource, handling the second virtual interrupt signals by the particular processors of the destination processing resource based on comparisons of the interrupt identification information of the second interrupt signals with the logical identifiers associated with the particular processors of the destination processing resource and reprogramming the address conversion component so that further incoming interrupt signals are directed to the destination processing resource.

2. The method of claim 1, wherein the address conversion component is an abstraction table.

3. The method of claim 2, wherein the abstraction table is within at least one of a processor agent and an input/output (I/O) hierarchy.

4. The method of claim 1, wherein the incoming interrupt signals have at least one address recognized by an operating system associated with the portion of the computer system.

5. The method of claim 4, wherein the operative portion of the computer system is a first partition of the computer system with which the operating system is associated, the computer system having a plurality of partitions that includes the first partition.

6. The method of claim 4, wherein the first virtual interrupt signals are converted to into physical interrupt signals by an additional address conversion component.

7. The method of claim 6, wherein the sending comprises sending the interrupt signals between the address conversion components by way of at least one intermediate fabric component.

8. The method of claim 1, wherein the incoming interrupt signals are received at least indirectly from at least one of an input/output (I/O) device and a processing device.

9. The method of claim 1, further comprising:
prior to the accumulating, programming the destination processing resource to include a plurality of logical identifiers that are stored at the source processing resource.

10. The method of claim 1, wherein at least a portion of the control component and the infrastructure is a management agent that includes a control storage register (CSR) within which are accumulated the incoming interrupt signals.

11. The method of claim 1, wherein the source processing resource is a first source core within a source socket having a plurality of source cores including the first source core and at least one additional source core, wherein the destination processing resource is a first destination core within a destination socket having a plurality of destination cores including the first destination core and at least one additional destination core, and wherein the accumulating and the ending are repeated with respect to each of the at least one additional source and destination cores.

12. A method of handling interrupts during a migration of an operative portion of a computer system from a source processing resource to a destination processing resource, the method comprising:
(a) programming an address conversion component so that incoming interrupt signals are directed to a control component rather than to the source processing resource;
(b) accumulating the incoming interrupt signals at the control component; and
additionally, subsequent to the migration operative portion of the computer system from the source processing resource to the destination processing resource,
(c) sending the accumulated incoming interrupt signals to the destination processing resource;
(d) reprogramming the address conversion component so that further incoming interrupt signals are directed to the destination processing resource;
prior to (b), providing a first code to the destination processing resource indicating that the destination processing resource is to be governed by the control component and infrastructure; and
subsequent to (b), providing a second code to the destination processing resource indicating that the destination processing resource is no longer to be governed by the control component and infrastructure.

13. A method of operating a computer system, the method comprising:
determining that an operative portion of the computer system should migrate from a first hardware resource comprising processors associated with respective logical identifiers to a second hardware resource comprising respective processors;
configuring a first address conversion component of the computer system to direct first virtual interrupt signals to a temporary storage component rather than to the first hardware resource;
migrating the operative portion of the computer system from the first hardware resource to the second hardware resource, wherein the migrating comprises associating the logical identifiers associated with respective ones of the processors of the source processing resource with particular ones of the processors of the destination processing resource; and
after the migrating, configuring at least one of the first address conversion component and a second address conversion component of the computer system to direct the stored first virtual interrupt signals and second virtual interrupt signals to the second hardware resource, wherein the configuring comprises configuring at least one of the first address conversion component and a second address conversion component to: convert the first virtual interrupt signals into physical interrupt signals that comprise first respective physical address information and respective interrupt identification information and are designated to be routed over a fabric network; and convert the routed physical interrupt signals into second virtual interrupt signals that comprise second respective virtual address information and the respective interrupt identification information and are designated to be delivered to the second hardware resource.

14. The method of claim 13, wherein the computer system is a multiprocessor system, and the first and second hardware resources include first and second cores, respectively.

15. The method of claim 14, wherein the first and second hardware resources are first and second sockets that respectively include the first and second cores, respectively.

16. The method of claim 13,
wherein an operating system associated with the operative portion of the computer system only has access to the virtual interrupt signals and not to the physical interrupt signals.

17. The method of claim 16, wherein the first virtual interrupt signals are received from at least one of an input/output (I/O) device and a processing device.

18. The method of claim 13, wherein the associating comprises at least one of transferring and copying a plurality of the logical identifiers associated with from the first hardware resource to the second hardware resource.

19. A system for handling interrupts within a computer system having first and second processing devices comprising respective processors, the system comprising:
at least one address conversion device coupled at least indirectly to each of the first and second processing devices at least at different respective times operable to perform operations comprising converting incoming interrupt signals that are routable in a first virtual address space to interrupt signals that are routable in a second virtual address space; and
a control component that is addressable in the second address space and is operable to perform operations comprising communicating with the at least one address conversion device and accumulating interrupt signals in the second virtual address space; and
a programming component that is operable to perform operations during a migration of a first operative portion of the computer system from the first processing device to the second processing device wherein logical identifiers associated with respective ones of the processors of the first processing device are associated with particular ones of the processors of the second processing device, the operations comprising
reprogramming the at least one address conversion device to convert the incoming interrupt signals in the first virtual address space that are directed to the first processing component to interrupt signals in the second virtual address space that are redirected to the control component instead of the first processing device to enable the control component to accumulate the redirected interrupt signals,
wherein the reprogramming comprises configuring the at least one address conversion device to: convert the first virtual interrupt signals into physical interrupt signals that comprise first respective physical address information and respective interrupt identification information and are designated to be routed over a fabric network; and convert the routed physical interrupt signals into second virtual interrupt signals that comprise second respective virtual address information and the respective interrupt identification information and are designated to be delivered to the second processing device.

20. The system of claim 19, wherein the first operative portion of the computer system is a partition of the computer system with which is associated a first operating system that has access only to the virtual interrupt signals and not to the physical interrupt signals.

21. The system of claim 19 wherein, while the control component is accumulating the interrupt signals, the control component also continues to forward additional interrupt signals not intended for the first operative portion of the first processing device either to the first processing device or to the second processing device, wherein at least one core provided on the first and second processing devices continues to operate during the migration of the first operative portion even though a granularity of the at least one address conversion device is at a socket level and not at a core/thread level.

* * * * *

UNITED STATES PATENT AND TRADEMARK OFFICE
CERTIFICATE OF CORRECTION

PATENT NO. : 8,612,973 B2
APPLICATION NO. : 11/861846
DATED : December 17, 2013
INVENTOR(S) : Chris M. Giles et al.

It is certified that error appears in the above-identified patent and that said Letters Patent is hereby corrected as shown below:

In the Claims

In column 13, line 24, in Claim 1, after "second" insert -- virtual --.

In column 13, line 45, in Claim 6, after "converted" delete "to".

In column 14, line 3, in Claim 11, delete "ending" and insert -- sending --, therefor.

In column 14, line 16, in Claim 12, after "migration" insert -- of the --.

Signed and Sealed this
Twenty-ninth Day of April, 2014

Michelle K. Lee
*Deputy Director of the United States Patent and Trademark Office*